United States Patent Office 3,193,007
Patented July 6, 1965

---

3,193,007
METHOD FOR CONTROLLING INJECTIVITY PROFILES
Othar M. Kiel, Vincent V. Valleroy, and Bertram T. Willman, Tulsa, Okla., assignors, by mesne assignments, to Esso Production Research Company, Houston, Tex., a corporation of Delaware
No Drawing. Filed June 29, 1962, Ser. No. 206,180
5 Claims. (Cl. 166—10)

This invention relates to a method for controlling the injectivity profile of a permeable subterranean formation surrounding a wellbore, during the injection of a treating fluid through the wellbore and into the formation thereby increasing the injection capacity of the formation. In a specific embodiment the invention is concerned with improving the injection profiles, and with increasing the overall injection capacity of the input wells of a waterflooding project by a surfactant treatment or other well stimulation treatment which includes the use of a selective temporary plugging material.

Well treatments which involve the injection of a treating fluid are typically applied to an underground structure or formation which includes several zones having widely differing capacities to accept the injected fluid. A plot of injection flow rates for each zone, versus depth, is known as an injection profile, or as an injectivity profile. For the purposes of this disclosure, no essential distinction between the terms is observed.

There are two primary requisites for achieving a successful and economical injection treatment. First, the treating fluid must contact substantially all zones of the formation being treated. Second, the overall injectivity of the formation must be great enough to permit practical injection flow rates. These requisites are interdependent, since a uniform injection profile not only contributes to a uniform treatment of all zones, but also leads to increased overall injectivity.

The method of the invention is applicable to various types of well treatments, including but not limited to treatments to increase the porosity of a chemically-soluble oil bearing formation, surfactant stimulation treatments to increase the capacity of a well, and water shut-off techniques for use during an air drilling operation. In short, the method is applicable whenever it is desired to correct irregularities in an injection profile surrounding a wellbore. The method of the invention is applicable in either an open hole or a cased well completion.

Broadly, the method of the invention comprises introducing into such a wellbore, preferably with the treating fluid, a plugging agent which is slowly soluble in the treating fluid, whereby the flow of the treating fluid into a first, more permeable, zone of the formation is temporarily and selectively restricted, thereby causing increased acceptance of the treating fluid by a second, less permeable, zone of the formation, and then with continued injection, the plugging agent is slowly dissolved and dissipated within the formation, thereby rendering more uniform the overall injectivity profile surrounding the wellbore. The overall injection capacity of the formation is also increased.

The invention is particularly applicable in the recovery of petroleum from a porous earth reservoir penetrated by one or more injection wells and one or more production wells, wherein the petroleum is displaced toward the production wells by the injection of a displacing medium, such as water or liquefied petroleum gases, through the injection walls. In such a process it has been observed that the injection capacity of the injection wells slowly declines over an interval of time with the result that a well treatment is periodically required in order to at least partially restore the injectivity of the injection wells. A particularly effective well treatment which has been found useful in restoring such injectivity comprises the injection of substantial quantities of surfactant solution. Such treatment has the effect of washing accumulated or indigenous particles from the wellbore wall and dissipating such materials a substantial distance into the formation away from the high resistance area around the wellbore, thus restoring at least a substantial portion of the original injection capacity.

However, the effectiveness of such surfactant treatment is severly limited by irregularities in the injectivity profile surrounding the wellbore. Accordingly, it is an object of the invention to correct such irregularities in the injection profile during a well treatment.

It has been observed by various workers in the art that injectivity profiles after some extended time of injection do not correlate with permeability profiles as established by core analysis. See for example the Oil & Gas Journal, vol. 60, No. 11, pages 92–95, and Producers Monthly, vol. 26, No. 2, pages 2–6. The reasons for such lack of correlation have not been established with any substantial degree of certainty. Whatever the mechanism is, however, the conditions responsible for this phenomenon are nevertheless amenable to correction in accordance with the method disclosed herein. It is an object of the present invention to provide such corrective measures by a selective temporary plugging technique.

In accordance with a preferred embodiment of the invention, the selectivity of the plugging action is further increased by temporarily reducing well head injection pressures. A reduction of at least 10 p.s.i., and preferably at least 50 p.s.i., is required in order to provide a significant increase in selectivity. The step of reducing injection pressure should come just before, during or just after the introduction of the plugging agent depending on specific well conditions. The effect of a substantial reduction in injection pressure is to limit flow into the formation to the zones of highest injectivity. Inherently therefore, the plugging agent seeks out and plugs only these zones of highest injectivity. Thereafter when the plugging agent is in place, normal treating injection pressures are resumed with the result that the injectivity profile during the remainder of the surfactant or other chemical treatment is substantially improved. The plugging agent eventually dissolves and is dissipated into the formation so that no separate step is required in order to remove the plugging agent.

The selective plugging material of the invention must satisfy two general requirements. It must effectively plug the more permeable zones of the treated formation, at least until substantially increased injectivity is established in the zones of lower permeability, and it must also be slowly soluble in the treating fluid in order to become dissipated into the formation without the need for a separate step of removing the plugging material from the borehole wall, or from the pores of the formation near the borehole.

The first of these requirements is satisfied by selecting a material which has a particle size falling within a suitable range, or which forms a gelatinous filter cake on the borehole wall. The particle size required for satisfactory results depends primarily upon the pore size of the formation to be treated. For the treatment of most formations, a satisfactory range of particle sizes includes particles which pass a 12 mesh sieve and are retained on a 270 mesh sieve. However, this range is not considered to be limiting, since particle sizes outside this range may be suitable in unusual cases.

The density of the plugging material should not differ greatly from the density of the treating material in which it is suspended. This will contribute to the facility with which the material remains in place opposite the more permeable zones.

The second of the above requirements is satisfied by selecting a material of limited total solubility, which preferably forms a 0.01% to 3% solution in the treatment fluid, or by selecting a material which dissolves very slowly, preferably within the range of 10 hours to 7 days, regardless of the amount required to saturate a given volume of the treatment fluid.

Examples of suitable plugging materials of limited solubility are benzoic acid, 1-naphthoic acid, 2-naphthoic acid, and calcium hydroxide. Examples of highly soluble materials which nevertheless dissolve very slowly are polyvinyl alcohol and polyvinyl acrylamide. The amount of material required in any given operation depends upon the extent or degree of plugging desired, and upon the effectiveness of the particular material chosen. A satisfactory range includes amounts from about one ounce up to about 6 pounds or more per gallon of treating fluid.

Well treatments conducted in accordance with the invention are usually terminated after a period ranging from two days up to as much as a month or more. Since the need for plugging action normally ends with or before the end of the treatment itself, the selection of a plugging material is governed by the expected duration of the injection treatment.

As an example of the preferred embodiments of the invention, a water-input well of a waterflood petroleum recovery project is subjected to treatment with a 1% aqueous solution of furfuryl alcohol, containing about one pound per gallon of benzoic acid suspended therein as a temporary selective plugging agent. The wellhead injection pressure of 450 p.s.i.g. is reduced to 375 p.s.i.g. just before switching from normal floodwater to the treating fluid. This reduction in pressure is to increase the degree of selectivity with which the plugging material seeks out the more permeable streaks of the treated formation.

The injection of treating fluid is continued for one day during which time the total injection rate increases, at constant wellhead pressure, from about 30 bbls. per day before treatment to about 60 bbls. per day after treatment, indicating an injectivity increase of 100%. Flowmeter logs, run before and after treatment, show that the injectivity profile is greatly improved.

What is claimed is:

1. In the recovery of petroleum from a porous earth reservoir penetrated by an injection well and a production well, wherein said petroleum is displaced toward said production well by the injection of a displacing medium through said injection well; wherein the injection capacity of said injection well declines substantially over a prolonged interval of time; and wherein a first zone of said formation has a greater injectivity than a second zone thereof, the method of at least partially restoring said injection capacity which comprises injecting a surfactant solution into said injection well, introducing benzoic acid into said injection well as a temporary plugging agent, whereby the flow of said surfactant solution into said first, more permeable, zone is temporarily and selectively restricted, thereby causing increased acceptance of said surfactant solution by said second, less permeable, zone, and then after surfactant treatment continuing to inject said displacing medium, whereby said plugging agent is dissolved and dissipated within said formation, whereupon the injection profile in the formation surrounding the said injection well is rendered more uniform.

2. A method as defined by claim 1 including the step of substantially reducing wellbore pressure during said surfactant treatment.

3. A method as defined by claim 1 further comprising the step of substantially reducing wellbore pressure just before said surfactant treatment.

4. A method as defined by claim 1 further comprising the step of substantially reducing wellbore pressure just before introducing said plugging agent.

5. A method for controlling the injection profile in a permeable formation surrounding a wellbore during the injection of a fluid through said wellbore and into said formation, wherein a first zone of said formation initially accepts said fluid more readily than a second zone thereof, which comprises introducing into said wellbore a plugging agent selected from the group consisting of benzoic acid, naphthoic acid, calcium hydroxide, polyvinyl alcohol, and polyvinyl acrylamide, whereby the flow of said fluid into said first zone is temporarily and selectively restricted, thereby causing increased acceptance of said fluid by said second zone, and then continuing to inject said fluid, whereby said plugging agent is dissolved and dissipated within said formation, whereupon the injection profile in the formation surrounding said wellbore is rendered more uniform.

References Cited by the Examiner

UNITED STATES PATENTS

| 2,669,306 | 2/54 | Teter et al. | 166—9 |
| 2,804,145 | 3/57 | Holbrook. | |
| 2,832,414 | 4/58 | Battle | 166—29 X |
| 3,082,822 | 3/63 | Holm et al. | 166—9 |
| 3,103,974 | 9/63 | Sievert et al. | 166—30 |

BENJAMIN HERSH, *Primary Examiner.*